US012756307B2

(12) United States Patent
Chen

(10) Patent No.: US 12,756,307 B2
(45) Date of Patent: Oct. 6, 2026

(54) POWER CONVERTER

(71) Applicant: NOVATEK MICROELECTRONICS CORP., Hsinchu (TW)

(72) Inventor: Wei-Ling Chen, Zhubei City (TW)

(73) Assignee: Novatek Microelectronics Corp., Hsinchu (TW)

( * ) Notice: Subject to any disclaimer, the term of this patent is extended or adjusted under 35 U.S.C. 154(b) by 295 days.

(21) Appl. No.: 18/325,223

(22) Filed: May 30, 2023

(65) Prior Publication Data

US 2024/0405673 A1 Dec. 5, 2024

(51) Int. Cl.
*H02M 3/156* (2006.01)
*H05B 45/38* (2020.01)

(52) U.S. Cl.
CPC ............ *H02M 3/156* (2013.01); *H05B 45/38* (2020.01)

(58) Field of Classification Search
CPC .. H02M 3/1582; H02M 3/1584; H02M 3/156; H02M 3/1588
See application file for complete search history.

(56) References Cited

U.S. PATENT DOCUMENTS

2011/0089917 A1* 4/2011 Chen .................. H02M 3/1584 323/282
2013/0141070 A1* 6/2013 Goessling .............. H02M 1/10 323/284
2021/0234462 A1* 7/2021 Cannillo ................ G05F 1/595

* cited by examiner

*Primary Examiner* — Nguyen Tran
(74) *Attorney, Agent, or Firm* — Rosenberg, Klein & Lee

(57) ABSTRACT

A power converter includes an input, an output, a first switch, a second switch, a third switch, a fourth switch, a fifth switch, and a sixth switch. The first switch and the second switch are coupled between the input and a reference voltage. The third switch is coupled between a first capacitor and the fourth switch. The first capacitor is coupled to the reference voltage. The fourth switch is coupled between the output and the third switch. A terminal of a second capacitor is coupled between the third switch and the fourth switch, and another terminal of the second capacitor is coupled between the first switch and the second switch through an inductor. The fifth switch is coupled between the reference voltage and the common node of the inductor and the second capacitor. The sixth switch is coupled between the common node and the first capacitor.

9 Claims, 4 Drawing Sheets

POWER CONVERTER

BACKGROUND OF THE INVENTION

Field of the Invention

The invention relates to a converter, particularly to a power converter.

Description of the Related Art

In general, notebook computers use light-emitting diode (LED) backlight displays, which require LED drivers to control the brightness and color of the LEDs. These drivers are typically integrated within the display module and controlled by the display controller on the motherboard. Using LED backlight displays and corresponding drivers, notebook computers can achieve higher efficiency and lower power consumption for display purposes.

The larger the size of a notebook computer, the larger the battery capacity and the number of batteries it typically requires. This is because larger notebook computers usually have higher power to drive more hardware and devices, such as larger displays, more USB ports, and more efficient processors. Therefore, to ensure sufficient usage time, larger notebook computers often require more or larger capacity batteries. On the contrary, smaller notebook computers may only require smaller capacity batteries, as they usually require less power to drive smaller displays and fewer hardware devices. In addition, some lightweight notebook computers may use non-standard batteries, such as built-in rechargeable batteries, to reduce size and weight.

SUMMARY OF THE INVENTION

The invention provides a power converter, which has a full-range voltage application and maintains power efficiency without using additional switches.

In an embodiment of the invention, a power converter is coupled to an inductor, a first capacitor, and a second capacitor. The first capacitor has a first terminal and a second terminal. The power converter includes a first switch, a second switch, a third switch, a fourth switch, a fifth switch, and a sixth switch. The first switch and the second switch are coupled in series and coupled between the input of the power converter and a reference voltage. The third switch is coupled between the first terminal of the first capacitor and the fourth switch. The second terminal of the first capacitor is coupled to the reference voltage. The fourth switch is coupled between the output of the power converter and the third switch. A terminal of the second capacitor is coupled between the third switch and the fourth switch, and another terminal of the second capacitor is coupled between the first switch and the second switch through the inductor. The fifth switch is coupled between the reference voltage and the common node of the inductor and the second capacitor. The sixth switch is coupled between the common node of the inductor and the second capacitor and the common node of the third switch and the first capacitor.

To sum up, the power converter couples multiple switches to two ends of an inductor to have a full-range voltage application and maintain power efficiency without using additional switches.

Below, the embodiments are described in detail in cooperation with the drawings to make easily understood the technical contents, characteristics and accomplishments of the invention.

DETAILED DESCRIPTION OF THE INVENTION

Figure 1:
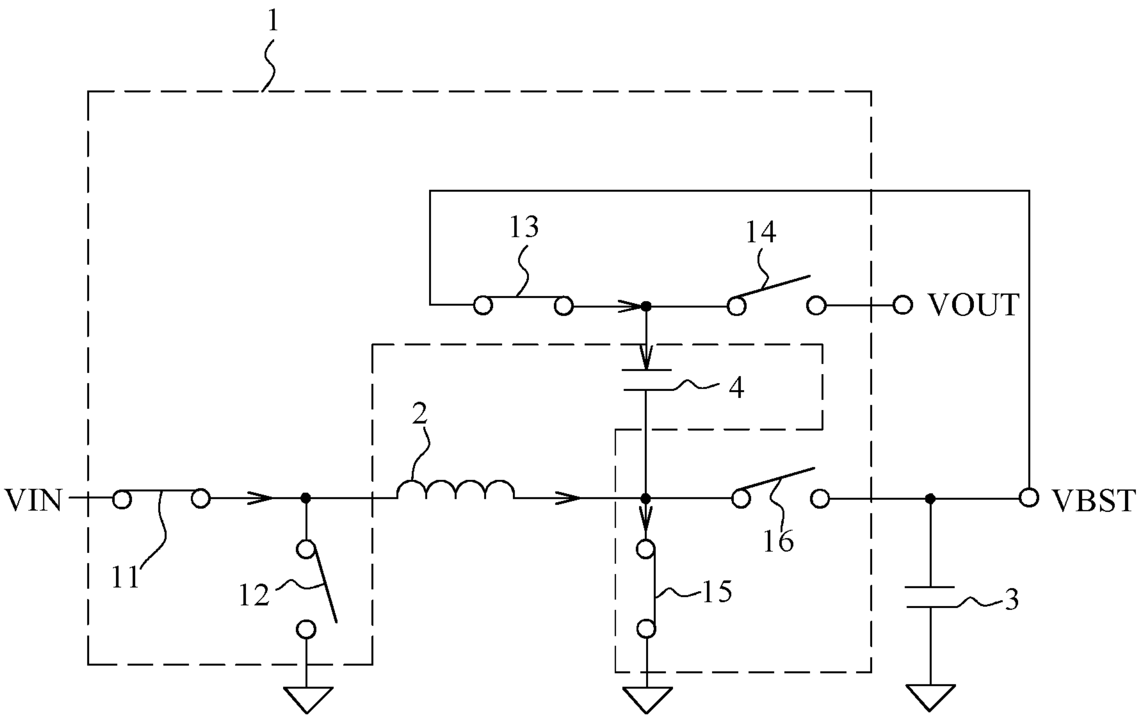
FIG. 1 is a diagram schematically illustrating a power converter that operates in a first phase according to an embodiment of the invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express what the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to using different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to encompass any indirect or direct connection. Accordingly, if this disclosure mentions that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

In the following description, a power converter will be described. The power converter couples switches to two ends of an inductor to have a full-range voltage application and maintain power efficiency without using additional switches. The power converters described below may also be applied to other circuit configurations.

FIG. 1 is a diagram schematically illustrating a power converter that operates in a first phase according to an embodiment of the invention. Referring to FIG. 1, a power converter 1 is introduced as follows. The power converter 1 is coupled to an inductor 2, a first capacitor 3, and a second capacitor 4. The power converter 1 includes a first switch 11, a second switch 12, a third switch 13, a fourth switch 14, a fifth switch 15, and a sixth switch 16. The second capacitor 4, the third switch 13, the fourth switch 14 form a charge pump. The first switch 11, the second switch 12, the third switch 13, the fourth switch 14, the fifth switch 15, and the sixth switch 16 may be, but not limited to, metal-oxide-semiconductor field effect transistors (MOSFETs). The first switch 11, the second switch 12, the third switch 13, the fourth switch 14, the fifth switch 15, and the sixth switch 16 may be integrated in an integrated circuit (IC). The first switch 11 and the second switch 12 are coupled in series and coupled between the input of the power converter 1 and a reference voltage. The reference voltage may be, but not limited to, a grounding voltage. The first capacitor 3 has a first terminal and a second terminal. The third switch 13 is coupled between the first terminal of the first capacitor 3 and the fourth switch 14. The second terminal of the first capacitor 3 is coupled to the reference voltage. The fourth switch 14 is coupled between the output of the power converter 1 and the third switch 13. A terminal of the second capacitor 4 is coupled between the third switch 13 and the fourth switch 14, and another terminal of the second capacitor 4 is coupled between the first switch 11 and the second switch 12 through the inductor 2. The fifth switch 15 is coupled between the reference voltage and the common node of the inductor 2 and the second capacitor 4. The sixth switch 16 is coupled between the common node of the inductor 2 and the second capacitor 4 and the common node of the third switch 13 and the first capacitor 3.

The operation of the power converter 1 is introduced as follows. When the input of the power converter 1 is coupled to an input voltage VIN, the common node of the third switch 13 and the first capacitor 3 generate a voltage VBST to be boosted and the output of the power converter 1 generates an output voltage VOUT. The input voltage VIN, the voltage VBST to be boosted, and the output voltage VOUT are positive direct-current (DC) voltages. The output voltage VOUT is greater than the input voltage VIN. The ratio of the output voltage VOUT to the voltage VBST to be boosted is a constant value such as 2, but the invention is not limited thereto. The output of the power converter 1 may be coupled to light-emitting diodes (LEDs). The output voltage VOUT depends on the number of the LEDs. For example, the output voltage VOUT required for one LED has a range of 0.7-1 V. The output voltage VOUT required for ten LEDs has a range of 7-10 V. The first switch 11, the second switch 12, the third switch 13, the fourth switch 14, the fifth switch 15, and the sixth switch 16 are periodically switched. One period when the first switch 11, the second switch 12, the third switch 13, the fourth switch 14, the fifth switch 15, and the sixth switch 16 are switched includes a first phase and a second phase when the input voltage VIN is greater than or less than the voltage VBST to be boosted.

In the first phase, the first switch 11, the third switch 13, and the fifth switch 15 are turned on, and the second switch 12, the fourth switch 14, and the sixth switch 16 are turned off. In the first phase, the input voltage VIN charges the inductor 2 through the first switch 11 such that a charging current flows through the first switch 11, the inductor 2, and the fifth switch 15. Simultaneously, the voltage VBST to be boosted charges the second capacitor 4 through the third switch 13.

Figure 2:
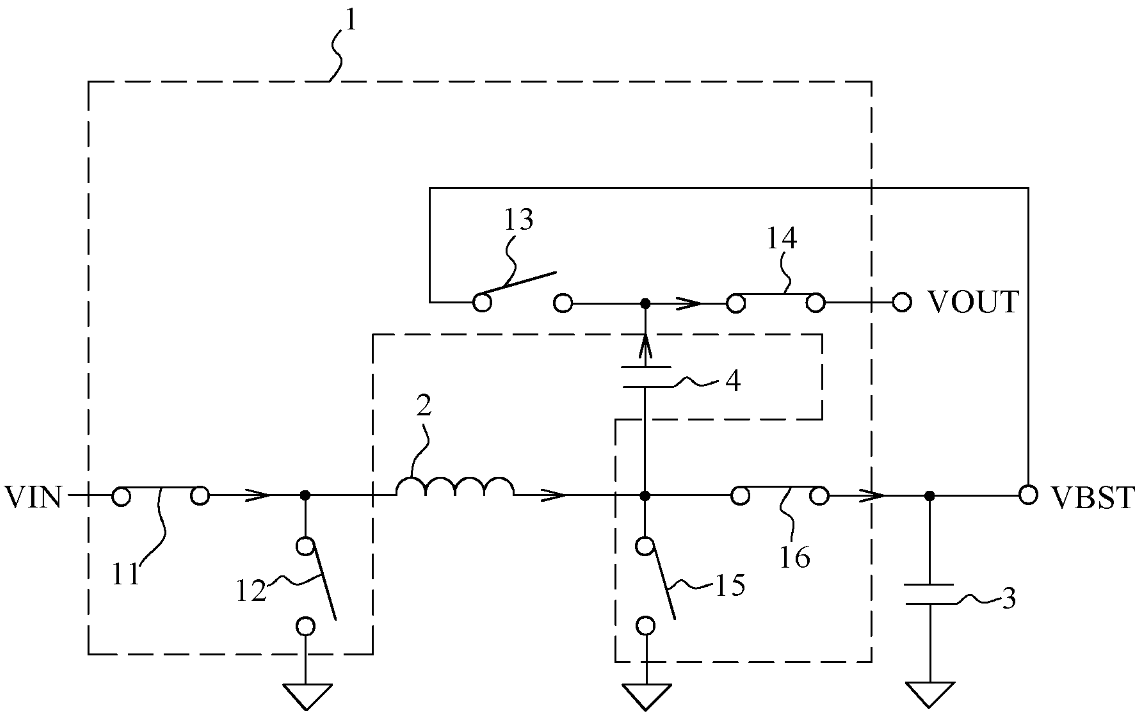
FIG. 2 is a diagram schematically illustrating a power converter that operates in a second phase according to an embodiment of the invention.

FIG. 2 is a diagram schematically illustrating a power converter that operates in a second phase according to an embodiment of the invention. Please refer to FIG. 2. In the second phase after the first phase, the first switch 11, the fourth switch 14, and the sixth switch 16 are turned on, and the second switch 12, the third switch 13, and the fifth switch 15 are turned off. In the second phase, the inductor 2 charges the first capacitor 3 through the sixth switch 16 and the first capacitor 3 is discharged to the reference voltage, such that a discharging current flows through the first switch 11, the inductor 2, the sixth switch 16, and the first capacitor 3. Simultaneously, the inductor 2 charges the second capacitor 4 and the second capacitor 4 is discharged to the LED coupled to the output of the power converter 1 through the fourth switch 14, such that the discharging current flows through the second capacitor 4, the fourth switch 14, and the LED.

Figure 3:
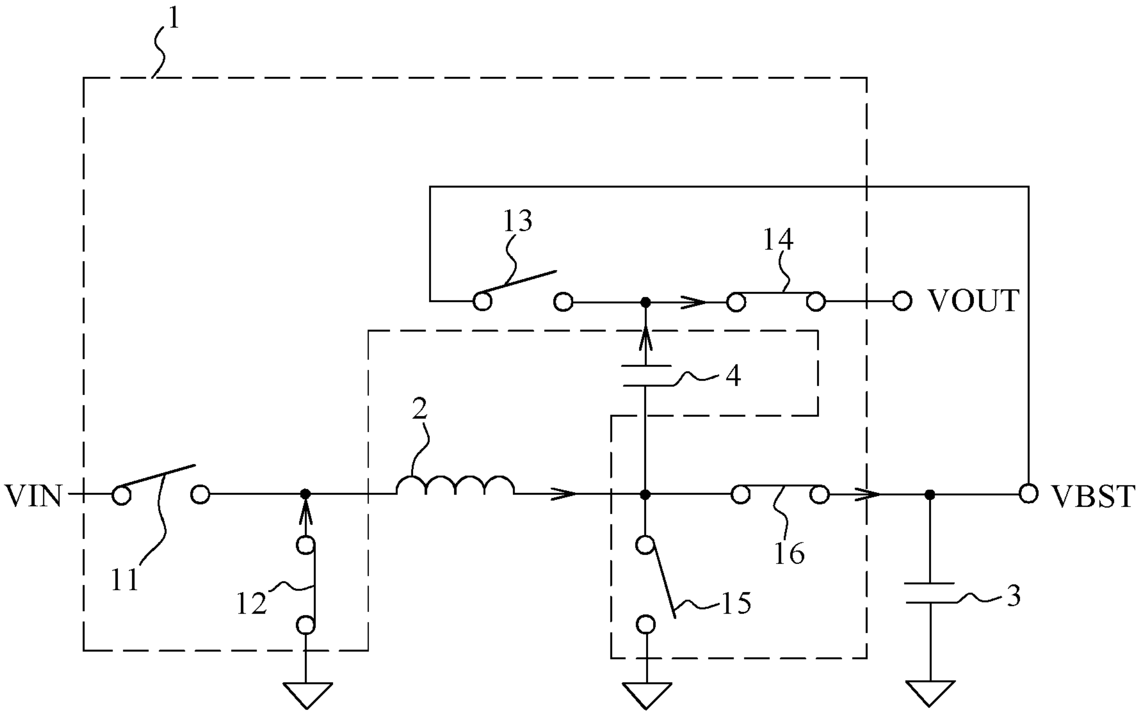
FIG. 3 is a diagram schematically illustrating a power converter that operates in a third phase according to an embodiment of the invention.

FIG. 3 is a diagram schematically illustrating a power converter that operates in a third phase according to an embodiment of the invention. Please refer to FIG. 3. The first switch 11, the second switch 12, the third switch 13, the fourth switch 14, the fifth switch 15, and the sixth switch 16 are switched during one period that includes the first phase, the second phase, and a third phase when the input voltage VIN is greater than the voltage VBST to be boosted. In the third phase after the second phase, the fourth switch 14, and the sixth switch 16 are turned on, and the first switch 11, the third switch 13, and the fifth switch 15 are turned off. In the third phase, the inductor 2 charges the first capacitor 3 through the sixth switch 16 and the first capacitor 3 is discharged to the reference voltage, such that a discharging current flows through the second switch 12, the inductor 2, the sixth switch 16, and the first capacitor 3. Simultaneously, the inductor 2 charges the second capacitor 4 and the second capacitor 4 is discharged to the LED coupled to the output of the power converter 1 through the fourth switch 14, such that the discharging current flows through the second capacitor 4, the fourth switch 14, and the LED. In other words, the power converter 1 can boost the input voltage VIN greater than or less than the voltage VBST to be boosted to generate the output voltage VOUT without using additional switches, thereby maintaining power efficiency.

Figure 4:
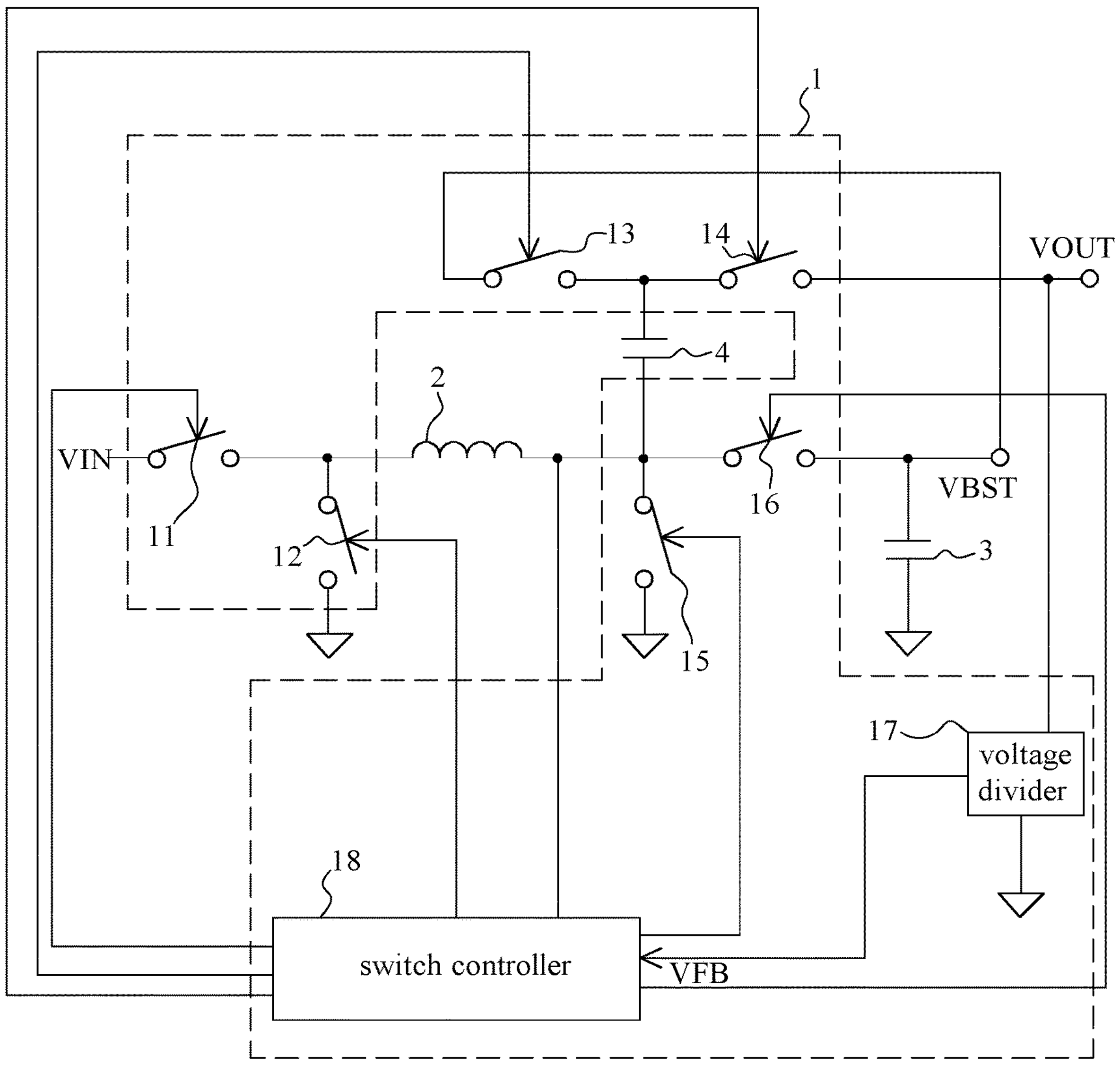
FIG. 4 is a diagram schematically illustrating a power converter according to another embodiment of the invention.

FIG. 4 is a diagram schematically illustrating a power converter according to another embodiment of the invention. Referring to FIG. 4, the power converter 1 may further include a voltage divider 17 and a switch controller 18. The voltage divider 17, coupled to the output of the power converter 1 and the switch controller 18, receives the output voltage VOUT to generate a feedback voltage VFB received by the switch controller 18. The switch controller 18 is coupled to the common node of the inductor 2 and the second capacitor 4, and the control terminals of the first switch 11, the second switch 12, the third switch 13, the fourth switch 14, the fifth switch 15, and the sixth switch 16. The switch controller 18 turns on or off the first switch 11, the second switch 12, the third switch 13, the fourth switch 14, the fifth switch 15, and the sixth switch 16 in the first phase, the second phase, or the third phase.

According to the embodiments provided above, the power converter has a full-range voltage application and maintains power efficiency without using additional switches.

The embodiments described above are only to exemplify the invention and not to limit the scope of the invention. Therefore, any equivalent modification or variation according to the shapes, structures, features, or spirit disclosed by the invention is to be also included within the scope of the invention.

What is claimed is:

1. A power converter, coupled to an inductor, a first capacitor with a first terminal and a second terminal, and a second capacitor, comprising:

a first switch and a second switch coupled in series and coupled between an input of the power converter and a reference voltage;

a third switch and a fourth switch, wherein the third switch is coupled between the first terminal of the first capacitor and the fourth switch, the second terminal of the first capacitor is coupled to the reference voltage, the fourth switch is coupled between an output of the power converter and the third switch, a terminal of the second capacitor is coupled between the third switch and the fourth switch, and another terminal of the second capacitor is coupled between the first switch and the second switch through the inductor;

a fifth switch coupled between the reference voltage and a first common node, wherein the first common node is located between of the inductor and the second capacitor; and a sixth switch coupled between the first common node and a second common node, wherein the second common node is located between the third switch and the first capacitor;

wherein a third terminal of the inductor is coupled to the second capacitor and coupled to the first capacitor through the sixth switch, and a fourth terminal of the inductor is coupled between the first switch and the second switch;

wherein the third terminal of the inductor is directly connected to the sixth switch and the fifth switch;

in a first phase, the first switch, the third switch, and the fifth switch are turned on, and the second switch, the fourth switch, and the sixth switch are turned off.

2. The power converter according to claim 1, wherein in a second phase after the first phase, the first switch, the fourth switch, and the sixth switch are turned on, and the second switch, the third switch, and the fifth switch are turned off.

3. The power converter according to claim 2, wherein in a third phase after the second phase, the fourth switch, and the sixth switch are turned on, and the first switch, the third switch, and the fifth switch are turned off.

4. The power converter according to claim 1, wherein, the input is coupled to an input voltage, the output is configured to generate an output voltage, the common node of the third switch and the first capacitor is configured to generate a voltage to be boosted, and a ratio of the output voltage to the voltage to be boosted is a constant value.

5. The power converter according to claim 4, wherein the input voltage is greater than the voltage to be boosted.

6. The power converter according to claim 4, wherein the input voltage is less than the voltage to be boosted.

7. The power converter according to claim 1, wherein the first switch, the second switch, the third switch, the fourth switch, the fifth switch, and the sixth switch are metal-oxide-semiconductor field effect transistors (MOSFETs).

8. The power converter according to claim 1, wherein the first switch, the second switch, the third switch, the fourth switch, the fifth switch, and the sixth switch are integrated in an integrated circuit (IC).

9. The power converter according to claim 1, further comprising a switch controller coupled to the output of the power converter, the common node of the inductor and the second capacitor, and control terminals of the first switch, the second switch, the third switch, the fourth switch, the fifth switch, and the sixth switch.

* * * * *